United States Patent
Day, III et al.

(10) Patent No.: US 7,134,044 B2
(45) Date of Patent: Nov. 7, 2006

(54) METHOD, SYSTEM, AND PROGRAM FOR PROVIDING A MIRROR COPY OF DATA

(75) Inventors: Kenneth Fairclough Day, III, Tucson, AZ (US); William Frank Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 10/222,615

(22) Filed: Aug. 16, 2002

(65) Prior Publication Data

US 2004/0034808 A1 Feb. 19, 2004

(51) Int. Cl.
*G06F 11/00* (2006.01)

(52) U.S. Cl. .......................................................... 714/6
(58) Field of Classification Search .................. 714/6
See application file for complete search history.

(56) References Cited

U.S. PATENT DOCUMENTS

| | | | |
|---|---|---|---|
| 4,525,800 A * | 6/1985 | Hamerla | 714/6 |
| 4,751,635 A | 6/1988 | Kret | |
| 5,155,845 A | 10/1992 | Beal et al. | |
| 5,379,412 A | 1/1995 | Eastridge et al. | |
| 5,537,533 A | 7/1996 | Staheli et al. | |
| 5,555,371 A | 9/1996 | Duyanovich et al. | |
| 5,682,513 A | 10/1997 | Candelaria et al. | |
| 5,720,029 A | 2/1998 | Kern et al. | |
| 6,052,797 A | 4/2000 | Ofek et al. | |
| 6,148,383 A | 11/2000 | Micka et al. | |
| 6,148,414 A * | 11/2000 | Brown et al. | 714/9 |
| 6,304,980 B1 | 10/2001 | Beardsley et al. | |
| 6,591,351 B1 * | 7/2003 | Urabe et al. | 711/162 |
| 6,606,694 B1 * | 8/2003 | Carteau | 711/162 |
| 6,618,818 B1 * | 9/2003 | Wahl et al. | 714/6 |
| 7,013,372 B1 * | 3/2006 | Achiwa et al. | 711/162 |
| 7,024,528 B1 * | 4/2006 | LeCrone et al. | 711/162 |
| 2005/0188254 A1 * | 8/2005 | Urabe et al. | 714/6 |

OTHER PUBLICATIONS

EMC White Paper, "EMC Symmetrix Remote Data Facility: Multi-Hop Capability", Jan. 2002, pp. 1-6.*
"EMC SRDF Family", 2006, http://www.emc.com/products/networking/srdf.jsp.*
Hewlett-Packard, "Designing Disaster Tolerant MC/ServiceGuard Clusters", 1999, pp. 1-7 and 35-64.*
PCT/GB03/03177 IPER mailed Nov. 25, 2004.
Amdahl Corporation, "Remote Data Mirroring for Disaster Recovery", Technical White Paper, Copyright Amdahl Corporation, Aug. 1999, pp. 1-13.
A. Pete, et al., "IBM Enterprise Storage Server Performance Monitoring and Tuning Guide", IBM Document No. SG24-5656-00, Jan. 2000, Chapter 5, pp. 37-44.
PCT/GB03/03177 International Search Report mailed Oct. 7, 2004.
PCT/GB03/03177 Written Opinion mailed Oct. 22, 2004.

* cited by examiner

*Primary Examiner*—Robert Beausoliel
*Assistant Examiner*—Michael Maskulinski
(74) *Attorney, Agent, or Firm*—David W. Victor; Konrad Raynes & Victor LLP

(57) ABSTRACT

Provided are a method, system, and program for providing a mirror copy of data. An update to a primary storage is received and transferred to an intermediate system in a first transfer mode. The update is transferred from the intermediate system to a secondary storage in a second transfer mode, wherein the secondary storage provides a mirror copy of updates to the primary storage.

28 Claims, 2 Drawing Sheets

US 7,134,044 B2

METHOD, SYSTEM, AND PROGRAM FOR PROVIDING A MIRROR COPY OF DATA

BACKGROUND OF THE INVENTION

1. Field of the Invention

The present invention relates to a method, system and program for providing a mirror copy of data.

2. Description of the Related Art

Data storage systems may maintain a secondary copy of data at a remote site to use in the event of a failure at the primary site. Such dual or shadow copies are typically made as the application system is writing new data to a primary storage device. International Business Machines Corporation (IBM®), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary storage and a secondary storage controller may be provided to control access to the secondary storage.

In prior art systems, there are generally two modes for transferring data from the primary to the secondary storage systems—asynchronous and synchronous. In asynchronous mode, the host transfers data to the primary storage and write acknowledgment is immediately returned to the host even before the data is committed on the secondary site. After receiving acknowledgment, a copy of the updates are transferred to secondary storage. Updates not yet transferred to secondary storage are maintained in a journal. With the asynchronous technique, delays at the host are minimized because the host receives immediate acknowledgment. However, the mirrored copy of the data on secondary storage is not current with the updates at the primary storage.

In synchronous mode, the host does not receive acknowledgment until the data is committed to the secondary storage and the acknowledgment is returned by the secondary storage. In this mode, the mirror copy is current because the host write is not complete until the data is transferred to the secondary site and the writes are confirmed as applied to the secondary storage in the same order as applied to the primary storage. Further, the performance in synchronous mode is substantially affected by the distance between the primary and the secondary site because performance degrades as the distance increases, i.e., the I/O rate at the host application depends on the distance between the primary and secondary sites. As the distance increases, the host application I/O processing rate significantly decreases because it takes longer for the secondary site to acknowledge the update of the data at the secondary storage site.

Accordingly, there is a need in the art for improved techniques for mirroring data between primary and secondary sites.

SUMMARY OF THE PREFERRED EMBODIMENTS

Provided are a method, system, and program for providing a mirror copy of data. An update to a primary storage is received and transferred to an intermediate system in a first transfer mode. The update is transferred from the intermediate system to a secondary storage in a second transfer mode, wherein the secondary storage provides a mirror copy of updates to the primary storage.

In further implementations, the first transfer mode comprises a synchronous transfer mode and the second transfer mode comprises an asynchronous transfer mode.

Still further, the update may be received from an application. In such case, acknowledgment is received from the intermediate system of the transferred update and acknowledgment is returned for the update to the application in response to receiving the acknowledgment from the intermediate system.

Further provided are a method, system, and program for providing a mirror copy of data. An update is received at a primary storage and transferred to an intermediary system along a first distance. The update is transferred from the intermediary system to a secondary storage along a second distance, wherein the first distance is shorter than the second distance, and wherein the secondary storage provides a mirror copy of updates to the primary storage.

Described implementations provide techniques for improving the transfer of updates to a primary storage at a primary site to a secondary storage at a secondary site by using an intermediary system at an additional site to buffer data being transferred between the primary and secondary sites.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations of the present invention. It is understood that other implementations may be utilized and structural and operational changes may be made without departing from the scope of the present invention.

Figure 1:
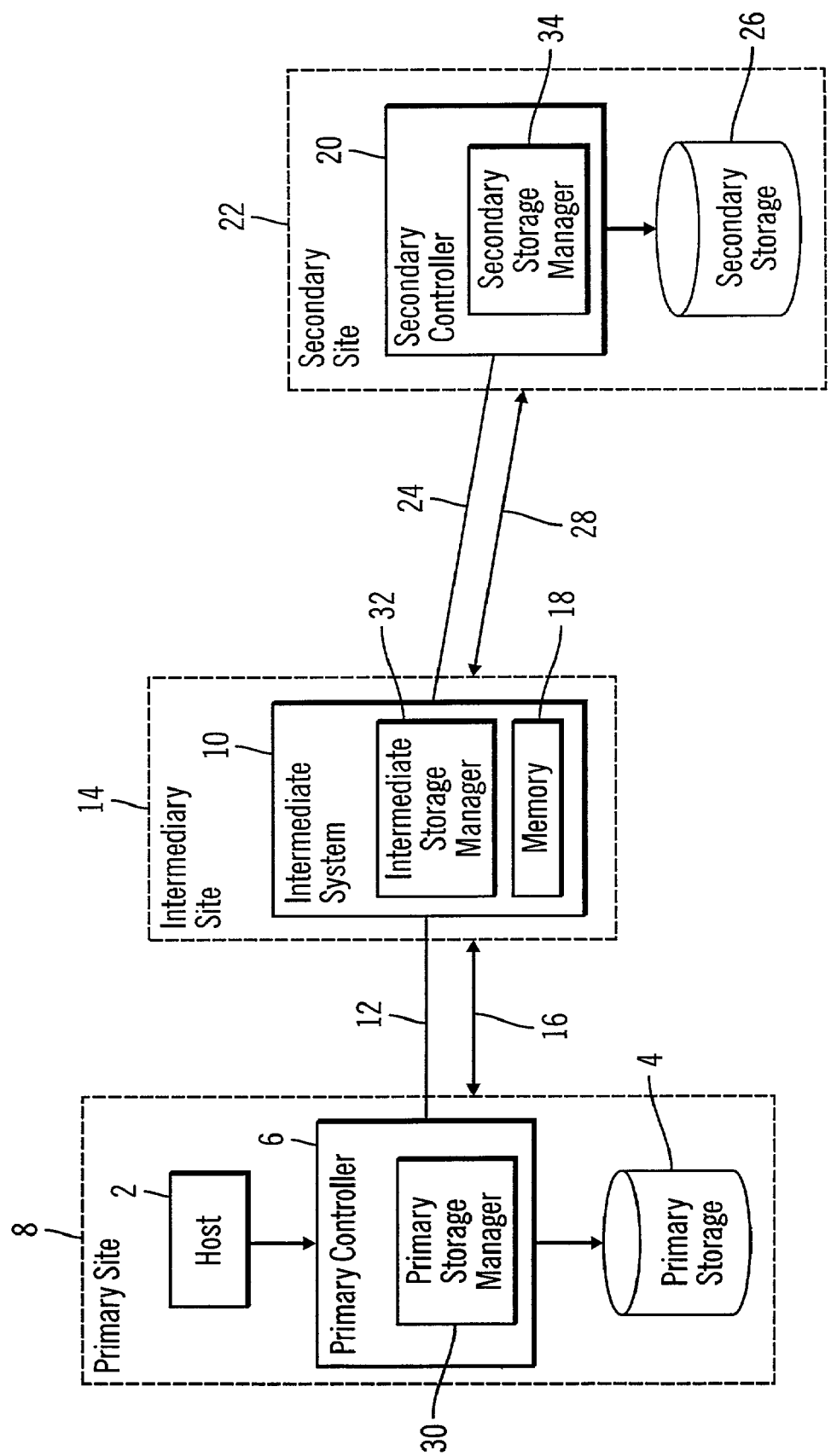
FIG. 1 illustrates a network computing environment in accordance with implementations of the invention.

FIG. 1 illustrates a network computing environment in which aspects of the invention are implemented. One or more hosts 2 (only one is shown) communicate Input/Output (I/O) requests to a primary storage 4 through a primary controller 6. The primary storage 4 and primary controller 6 are at a primary site 8. The host 2 is shown at the primary site 8, but may be located elsewhere. In certain implementations, the primary controller 6 transfers updates from host 2 applications to an intermediate system 10 via a connection 12. The intermediate system 10 is located at an intermediate site 14 that is a first distance 16 from the primary site 8. The host updates are buffered in the intermediate system 10 memory 18 and then transferred to a secondary controller 20 at a secondary site 22 via connection 24. The secondary controller 20 stores host updates to the primary storage 4 in a secondary storage 26 that provides a mirror copy of the data at the primary storage 4. The intermediate site 14 and secondary site 22 are separated by a second distance 28. In certain implementations, the second distance 28 exceeds the first distance 16.

A primary storage manager 30 performs data management operations at the primary controller 6, an intermediate storage manager 32 performs data management operations at the intermediate system 10, and a secondary storage manager 34 performs data management operations at the secondary controller 20.

The primary 6 and secondary 20 controllers may comprise any storage management system known in the art, such as a storage controller, server, enterprise storage server, etc. The intermediate system 10 may comprise any computer system known in the art. In certain implementations, the intermediate system 10 comprises a low cost computer, such as a personal computer or low-end server system, with sufficient memory 18 to adequately buffer data being transmitted from the primary controller 6 to the secondary controller 20. The primary 4 and secondary 26 storages may comprise any storage system or subsystem known in the art, such as a Direct Access Storage Device (DASD), Just a Bunch of Disks (JBOD), a Redundant Array of Independent Disks (RAID), virtualization device, tape storage, optical disk storage, or any other storage system known in the art. The connections 12 and 24 may be implemented using any network or connection technology known in the art, such as a Local Area Network (LAN), Wide Area Network (WAN), Storage Area Network (SAN), the Internet, an Intranet, etc.

In certain implementations, the primary 8, intermediary 14, and secondary 22 sites are implemented in different power boundaries, such that the destruction or substantial failure at one site will not impact the data stored at the other sites. Further, the primary 8, intermediary 14, and secondary 22 sites may be located in different areas, e.g., buildings, rooms, floors, geographical regions, etc.

Figure 2:
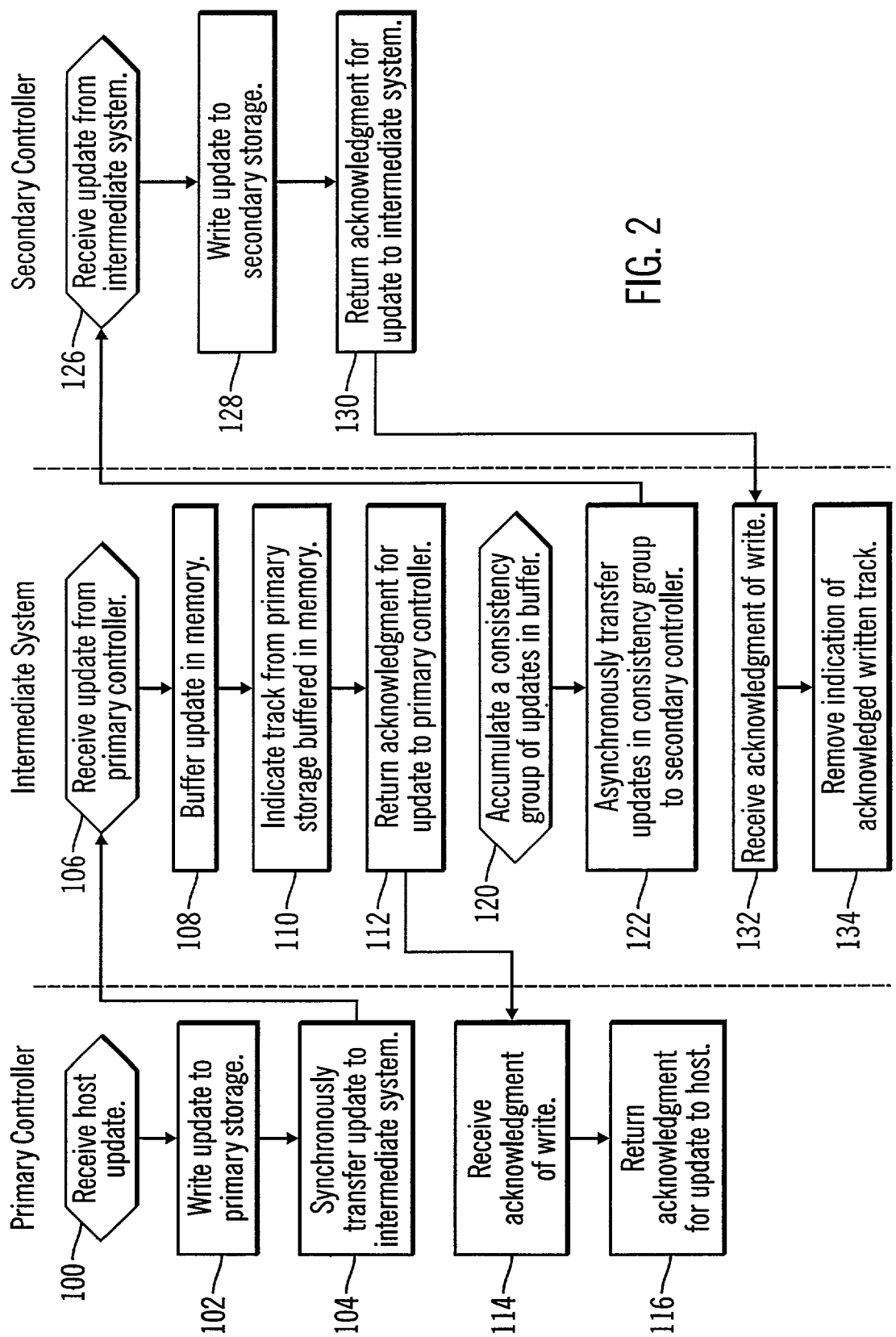
FIG. 2 illustrates logic to copy updates to a primary storage to a secondary storage in accordance with implementations of the invention.

FIG. 2 illustrates logic implemented in the primary 30, intermediate 32, and secondary 34 storage managers to transfer updates to the primary storage 4 to the secondary storage 26 in accordance with implementations of the invention. Upon receiving (at block 100) a host update, the primary storage manager 30 writes (at block 102) the update to the primary storage 4 and synchronously transfers (at block 104) the update to the intermediate system 10. At the intermediate system 10, in response (at block 106) to receiving the update from the primary controller 6, the intermediate storage manager 32 buffers (at block 108) the update in memory 18 and indicates (at block 110) the track in the primary storage 4 subject to the update. The intermediate storage manager 32 returns (at block 112) acknowledgment for the update to the primary controller 6. In response to receiving (at block 114) the acknowledgment, the primary storage manager 30 returns acknowledgment for the update to the host 2 application.

The intermediate system 10 will accumulate buffered updates into consistency groups in a manner known in the art. Upon accumulating (at block 120) an entire consistency group of updates, the intermediate storage manager 32 asynchronously transfers (at block 122) the updates in the completed consistency group to the secondary controller 20. Volumes in the primary and secondary DASDs are consistent when all writes have been transferred in their logical order, i.e., all dependent writes transferred first before the writes dependent thereon. A consistency group is a collection of updates to the primary volumes such that dependent writes are secured in a consistent manner. Consistency groups maintain data consistency across volumes and storage device.

In response to receiving (at block 126) an update from the intermediate system 10, the secondary storage manager 34 writes (at block 128) the update to the secondary storage 26 and returns (at block 130) acknowledgment for the update to the intermediate system 10. Upon receiving (at block 132) the acknowledgment, the intermediate storage manager 32 removes (at block 134) indication of the acknowledged updated track. In this way, the intermediate system 10 maintains track of all of those buffered updates in memory 18 that have not yet been acknowledged as committed in the secondary storage 26.

With the described implementations, by transferring data synchronously between the primary 8 and intermediate 14 sites, the host 2 application is assured that committed updates are mirrored at the intermediate system 10 and safely maintained in the event of a failure or disaster at the primary site 8. Further, by reducing the distance 16 of the synchronous transfer, the host response time degradation is minimized because any delays due to the distance of the round-trip synchronization is minimized. As discussed, the distance the data must travel for synchronization is a significant contributor to performance degradation. Moreover, in implementations where the intermediate system 10 (or intermediary site 14) is located less than halfway between the primary 8 and secondary 22 sites, the acknowledgment response time to the host 2 may be substantially improved. Further, bandwidth is also optimized because asynchronous transfer is used for the longer data transmission via connection 24 over the longer distance 28. Thus, the mode, i.e., asynchronous, that provides better bandwidth performance, is utilized for the longer distance travel.

Thus, the described implementations provide the security of synchronous transfer in that a mirror copy is guaranteed when acknowledgment is returned to the host 2 in a manner that reduces the response time degradation associated with synchronous transfers. In this way, the mirror copy is current at the intermediate system 10. At the same, time the described implementations provide improved bandwidth usage by using the asynchronous transfer mode for the longer connection 24 over the greater distance 28. Moreover, with the described implementations, consistency is maintained at the secondary storage 26 by having the intermediate system 10 transfer updates for a particular consistency group.

Additional Implementation Details

The data management techniques disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In further implementations, the intermediate system 10 may create an additional copy of the data by writing data to tape or some other storage systems. Still further, the intermediate system 10 can transfer the mirror copy back to the primary controller 6 for storage in an additional storage device, such as tape.

Further, the secondary controller may make additional physical copies of data at the secondary storage 26 whenever writing a consistency group or a logical copy, such as the case with Flash Copy and Snapshot, where the copy relationship is immediately established and the actual copying of the data occurs subsequently.

In further implementations, in the event of a failure at the primary site 8, the intermediate storage manager 32 may begin to transfer updates in memory 18 in synchronous mode to the secondary storage controller 34 to ensure that the updates are committed to the secondary storage 26.

In certain implementations, the primary controller 6 transferred data in synchronous mode to the intermediate system 10 and the intermediate system transferred data in an asynchronous mode to the secondary storage 26. In alternative implementations, data transfer modes different from those described herein may be used for the two transfer operations (i.e., from the primary to intermediary and intermediary to secondary), or the same transfer modes may be used for the two transfer operations.

In further implementations, additional intermediary systems may be added.

The logic of FIG. 2 describes specific operations occurring in a particular order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for providing a mirror copy of data, comprising:
    receiving, at an intermediate system, an update to a primary storage transferred in a first transfer mode;
    buffering, by the intermediate system, the received update only in a memory of the intermediate system;
    transferring, by the intermediate system, the update from the memory to a secondary storage in a second transfer mode, wherein the secondary storage provides a mirror copy of updates to the primary storage;
    communicating, by the intermediate system, a first acknowledgment for receiving the update as part of the first transfer mode; and
    receiving, by the intermediate system, a second acknowledgment for the update sent to the secondary storage as part of the second transfer mode.

2. The method of claim 1, wherein the first transfer mode comprises a synchronous transfer mode and the second transfer mode comprises an asynchronous transfer mode.

3. The method of claim 1, wherein the update is originated from an application, wherein communicating, by the intermediate system, the first acknowledgment for receiving the update comprises communicating the first acknowledgment of the received update to a primary controller, wherein the primary controller returns acknowledgment for the update to the application in response to receiving the first acknowledgment from the intermediate system.

4. The method of claim 3, wherein the intermediate system transfers the first acknowledgment to the primary controller before transferring the update to the secondary storage.

5. The method of claim 1, further comprising:
    indicating updated tracks in the primary storage buffered in the memory; and
    removing indication of the buffered updated tracks in the primary storage for which the second acknowledgment was received for the update sent to the secondary storage.

6. The method of claim 1, further comprising:
    accumulating received updates within a consistency group in the memory, wherein updates for a completed consistency group are transferred to the secondary storage in response to accumulating the updates into the consistency group.

7. A method for providing a mirror copy of data, comprising:
    receiving an update to a primary storage;
    transferring, in a first transfer mode, the update to an intermediary system along a first distance;
    buffering, by the intermediate system, the received update only in a memory of the intermediate system;
    communicating, by the intermediate system, a first acknowledgment for receiving the update as part of the first transfer mode;
    transferring, in a second transfer mode, the update from the intermediary system memory to a secondary storage along a second distance, wherein the first distance is shorter than the second distance, and wherein the secondary storage provides a mirror copy of updates to the primary storage; and
    receiving, by the intermediate system, a second acknowledgment for the update sent to the secondary storage as part of the second transfer mode.

8. The method of claim 7, wherein the first transfer mode comprises a synchronous transfer mode and wherein the second transfer mode comprises an asynchronous transfer mode.

9. The method of claim 7, wherein the primary storage, intermediate system, and secondary storage are within different power boundaries.

10. The method of claim 7, wherein the primary storage, intermediate system, and secondary storage are located in different buildings.

11. The method of claim 7, further comprising:
accumulating received updates within a consistency group in the memory, wherein updates for a completed consistency group are transferred to the secondary storage in response to accumulating the updates into the consistency group.

12. A system for providing a mirror copy of data in communication with a primary storage and secondary storage over at least one network, comprising:
a memory;
means for receiving an update to the primary storage transferred in a first transfer mode;
means for buffering the received update only in the memory;
means for transferring the update from the memory to the secondary storage in a second transfer mode, wherein the secondary storage provides a mirror copy of updates to the primary storage;
means for communicating a first acknowledgment for receiving the update as part of the first transfer mode; and
means for receiving a second acknowledgment for the update sent to the secondary storage as part of the second transfer mode.

13. The system of claim 11, wherein the first transfer mode comprises a synchronous transfer mode and the second transfer mode comprises an asynchronous transfer mode.

14. The system of claim 11, wherein the update is originated from an application, wherein a primary controller transfers the update to the primary storage over the network, wherein communicating the first acknowledgment for receiving the update comprises returning the first acknowledgment of the received update to the primary controller, wherein the primary controller returns acknowledgment for the update to the application in response to receiving the acknowledgment.

15. The system of claim 14, wherein the first acknowledgment is transferred to the primary controller before transferring the update to the secondary storage.

16. The system of claim 12, further comprising:
means for indicating updated tracks in the primary storage buffered in the memory; and
means for removing indication of the buffered updated tracks in the primary storage for which the second acknowledgment was received for the update sent to the secondary storage.

17. The system of claim 12, further comprising:
means for accumulating received updates within a consistency group in the memory, wherein updates for a completed consistency group are transferred to the secondary storage in response to accumulating the updates into the consistency group.

18. A system for providing a mirror copy of data, comprising:
a primary storage;
a secondary storage;
a primary controller coupled to the primary storage;
a secondary controller coupled to the secondary storage;
an intermediate system having a memory;
at least one network enabling communication among the primary controller, the secondary controller, and intermediate system;
means, implemented in the primary controller, to transfer, in a first transfer mode, an update to the primary storage to the intermediary system, wherein the primary controller and the intermediary system are separated by a first distance;
means, implemented in the intermediate system, for buffering the received update only in a memory of the intermediate system
means implemented in the intermediate system for communicating a first acknowledgment for receiving the update from the primary controller as part of the first transfer mode;
means, implemented in the intermediary system, for transferring, in a second transfer mode, the update from the memory to the secondary controller to store in the secondary storage, wherein the secondary controller and the intermediary system are separated by a second distance, wherein the first distance is shorter than the second distance, and wherein the secondary storage provides a mirror copy of updates to the primary storage; and
means, implemented in the intermediate system, for receiving a second acknowledgment for the update sent to the secondary storage controller as part of the second transfer mode.

19. The system of claim 18, wherein the first transfer mode comprises a synchronous transfer mode and wherein the second transfer mode comprises an asynchronous transfer mode.

20. The system of claim 18, wherein the primary controller, intermediate system, and secondary controller are within different power boundaries.

21. The system of claim 18, wherein the primary controller, intermediate system, and secondary controller are located in different buildings.

22. The system of claim 18, further comprising:
means for accumulating received updates within a consistency group in the memory, wherein updates for a completed consistency group are transferred to the secondary storage in response to accumulating the updates into the consistency group.

23. A compute readable medium including code adapted to provide a mirror copy of data updates to a primary storage at a secondary storage, wherein the code is capable of communicating with a memory and causing operations to be performed, the operations comprising:
receiving an update to the primary storage transferred in a first transfer mode;
buffering the received update only in the memory;
transferring the update to the secondary storage in a second transfer mode from the memory, wherein the secondary storage provides a mirror copy of updates to the primary storage;
communicating a first acknowledgment for receiving the update as part of the first transfer mode; and
receiving a second acknowledgment for the update sent to the secondary storage as part of the second transfer mode.

24. The computer readable medium of claim 23, wherein the first transfer mode comprises a synchronous transfer mode and the second transfer mode comprises an asynchronous transfer mode.

25. The computer readable medium of claim 24, wherein the first acknowledgment is transferred to the primary controller before transferring the update to the secondary storage.

26. The computer readable medium of claim 23, wherein the update is originated from an application, and wherein the received update to the primary storage is transferred by a primary controller, wherein communicating the first acknowledgment for receiving the update comprises communicating the first acknowledgment of the received update to the primary controller, wherein the primary controller returns acknowledgment for the update to the application in response to receiving the acknowledgment.

27. The computer readable medium of claim 23, further comprising:
   indicating updated tracks in the primary storage buffered in the memory;
   removing indication of the buffered updated tracks in the primary storage for which the second acknowledgment was received for the update sent to the secondary storage.

28. The computer readable medium of claim 23, further comprising:
   accumulating received updates within a consistency group in the memory, wherein updates for a completed consistency group are transferred to the secondary storage in response to accumulating the updates into the consistency group.

* * * * *